(12) United States Patent
Lu et al.

(10) Patent No.: US 12,339,543 B2
(45) Date of Patent: Jun. 24, 2025

(54) ELECTRONIC DEVICE

(71) Applicant: Innolux Corporation, Miao-Li County (TW)

(72) Inventors: You-Cheng Lu, Miao-Li County (TW); Yung-Hsun Wu, Miao-Li County (TW); Chia-Hao Tsai, Miao-Li County (TW); Yi-Shiuan Cherng, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 69 days.

(21) Appl. No.: 17/834,910

(22) Filed: Jun. 7, 2022

(65) Prior Publication Data

US 2023/0033343 A1 Feb. 2, 2023

Related U.S. Application Data

(60) Provisional application No. 63/226,769, filed on Jul. 29, 2021.

(30) Foreign Application Priority Data

Apr. 19, 2022 (CN) .......................... 202210411560.0

(51) Int. Cl.
*G02F 1/1339* (2006.01)
*G02F 1/1362* (2006.01)
*G02F 1/1368* (2006.01)

(52) U.S. Cl.
CPC ...... *G02F 1/13394* (2013.01); *G02F 1/13396* (2021.01); *G02F 1/136286* (2013.01); *G02F 1/136209* (2013.01); *G02F 1/13685* (2021.01)

(58) Field of Classification Search
CPC ............... G02F 1/1339; G02F 1/13394; G02F 1/13396; G02F 1/136286; G02F 1/13685; H01L 27/124

See application file for complete search history.

(56) References Cited

U.S. PATENT DOCUMENTS

| | | | |
|---|---|---|---|
| 2001/0052959 A1* | 12/2001 | Tamatani | G02F 1/13394 349/153 |
| 2005/0157238 A1 | 7/2005 | Yanagawa et al. | |
| 2019/0033636 A1* | 1/2019 | Morinaga | H01L 27/1248 |

FOREIGN PATENT DOCUMENTS

| | | |
|---|---|---|
| CN | 204595397 | 8/2015 |
| CN | 111736387 | 10/2020 |
| KR | 20050117031 | 12/2005 |

(Continued)

OTHER PUBLICATIONS

English translation & original publication of South Korean Patent Application Publication No. KR 10-2018-0044005, downloaded from Espacenet at https://worldwide.espacenet.com on Sep. 7, 2024. English translation provided by Google Translate tool in0site. (Year: 2018).*

(Continued)

*Primary Examiner* — Angela M. Medich
(74) *Attorney, Agent, or Firm* — JCIPRNET (57) ABSTRACT

An electronic device including a substrate, a signal line, and a spacer is provided. The signal line is disposed on the substrate and includes at least one curve segment. The spacer is disposed on the substrate and is disposed corresponding to the at least one curve segment.

17 Claims, 10 Drawing Sheets

(56) References Cited

FOREIGN PATENT DOCUMENTS

TW 594123 6/2004

OTHER PUBLICATIONS

"Office Action of Taiwan Counterpart Application", issued on Mar. 16, 2023, p. 1-p. 5.
"Office Action of Taiwan Counterpart Application", issued on Dec. 11, 2023, p. 1-p. 4.

* cited by examiner

ELECTRONIC DEVICE

CROSS-REFERENCE TO RELATED APPLICATION

This application claims the priority benefit of U.S. provisional application Ser. No. 63/226,769, filed on Jul. 29, 2021, and China application serial no. 202210411560.0, filed on Apr. 19, 2022. The entirety of each of the above-mentioned patent applications is hereby incorporated by reference herein and made a part of this specification.

BACKGROUND

Technical Field

The disclosure relates to an electronic device.

Description of Related Art

Most devices (such as display devices or light switches, etc.) have multiple spacers randomly arranged in multiple pixels to support cell gaps. These spacers are usually shaded by light shading patterns to reduce light leakage. When a device needs to increase the aperture ratio (or the transmittance), the space for disposing the spacers becomes limited.

SUMMARY

The disclosure provides an electronic device which may improve the aperture ratio or the transmittance.

In an embodiment of the disclosure, the electronic device includes a substrate, a signal line, and a spacer. The signal line is disposed on the substrate and includes at least one curve segment. The spacer is disposed on the substrate and is disposed corresponding to the at least one curve segment.

In order to make the aforementioned features and advantages of the disclosure comprehensible, embodiments accompanied with drawings are described in detail below.

BRIEF DESCRIPTION OF THE DRAWING

The accompanying drawings are included to provide a further understanding of the disclosure, and are incorporated in and constitute a part of this specification. The drawings illustrate examples of the disclosure and, together with the description, serve to explain the principles of the disclosure.

DETAILED DESCRIPTION OF DISCLOSED EMBODIMENTS

References of the exemplary embodiments of the disclosure are to be made in detail.

Examples of the exemplary embodiments are illustrated in the drawings. If applicable, the same reference numerals in the drawings and the descriptions indicate the same or similar parts.

Certain terms may be used throughout the disclosure and the appended patent claims to refer to specific elements. It should be understood by those of ordinary skill in the art that electronic device manufacturers may refer to the same element by different names. The disclosure does not intend to distinguish between elements that have the same function but have different names. In the following description and patent claims, words such as "comprising" and "including" are open-ended words, so they should be interpreted as meaning "including but not limited to . . . ".

In the disclosure, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative sizes, thicknesses, and locations of the layers, regions, and/or structures may be reduced or enlarged for clarity.

A structure (or layer, element, substrate) described in this disclosure is located on/above another structure (or layer, element, substrate), may indicate that the two structures are adjacent and directly connected, or may indicate that the two structures are adjacent but not directly connected. Indirect connection means that there is at least one intermediate structure (or intermediate layer, intermediate element, intermediate substrate, intermediate spacer) between the two structures, the lower surface of one structure is adjacent to or directly connected to the upper surface of the intermediate structure, and the upper surface of another structure is adjacent to or directly connected to the lower surface of the intermediate structure. The intermediate structure may be composed of a single-layer or multi-layer physical structure or a non-physical structure, which is not limited thereto. In the disclosure, when a certain structure is disposed "on" other structures, it may mean that a certain structure is "directly" on other structures, or it means that a certain structure is "indirectly" on other structures, that is, at least one structure is sandwiched between a certain structure and other structures.

The terms "about", "equal to", "equal" or "same", "substantially" or "generally" are interpreted as within 20% of a given value or range, or interpreted as within 10%, 5%, 3%, 2%, 1%, or 0.5% of the given value or range.

The terms such as "first", "second", etc. used in the description and the patent claims are used to modify elements, which do not imply and represent that the (or these) elements have any previous ordinal numbers, and also does not represent the order of a certain element and another element, or the order of the manufacturing method. The use of these ordinal numbers is to only clearly distinguish an element with a certain name from another element with the same name. The same terms may not be used in the patent claims and the description, and accordingly, the first component in the description may be the second component in the patent claims.

The electrical connection or coupling described in the disclosure may refer to direct connection or indirect connection. In the case of a direct connection, the end points of two elements on a circuit directly connect to each other, or connect to each other through a conductive wire. In the case of indirect connection, a switch, a diode, a capacitor, an inductor, a resistor, other suitable elements, or a combination thereof, but not limited therein, is between the end points of two elements on a circuit.

In the disclosure, the thickness, length, and width may be measured by adopting a measurement method such as an optical microscope (OM), and the thickness or width may be measured from a cross-sectional image in an electronic microscope, but not limited thereto. In addition, any two values or directions used for comparison may have certain errors. Additionally, references to the terms "equal to," "equal," "same," "substantially," or "generally" throughout this disclosure generally mean within 10% of a given value or range. Furthermore, the terms "a given range is from a first value to a second value", "a given range is within a range from the first value to the second value" means that the given range includes the first value, the second value, and other values in between. If a first direction is perpendicular to a second direction, an angle between the first direction and the second direction may be between 80 degrees and 100 degrees; if the first direction is parallel to the second direction, an angle between the first direction and the second direction may be between 0 degrees and 10 degrees.

It should be noted that, in the following embodiments, the features in several different embodiments may be replaced, reorganized, and mixed to complete other embodiments without departing from the spirit of the disclosure. As long as the features of the various embodiments do not violate the spirit of the disclosure or conflict with one another, they may be mixed and matched arbitrarily.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined in the embodiments of the disclosure.

In the disclosure, the electronic device may include a display device, a backlight device, an antenna device, a sensing device or a splicing device, but not limited thereto. The electronic device may be a bendable or flexible electronic device. The display device may be a non-self-luminous display device or a self-luminous display device. The electronic device may include, for example, liquid crystal, light emitting diode, fluorescence, phosphor, quantum dot (QD), other suitable display media, or a combination thereof. The antenna device may be a liquid crystal antenna device or a non-liquid crystal antenna device, and the sensing device may be a sensing device for sensing capacitance, light, heat or ultrasonic waves, but not limited thereto. In the disclosure, an electronic device may include electronic elements, and the electronic elements may include passive elements and active elements, such as a capacitor, a resistor, an inductor, a diode, a transistor, and the like. The diode may include a light emitting diode or a photodiode. The light emitting diode may include, for example, an organic light emitting diode (OLED), a mini light emitting diode (mini LED), a micro light emitting diode (micro LED), or a quantum dot light emitting diode (quantum dot LED), but not limited thereto. The splicing device may be, for example, a display splicing device or an antenna splicing device, but not limited thereto. It should be noted that, the electronic device may be any arrangement and combination of the foregoing, but not limited thereto. In addition, the shape of the electronic device may be rectangular, circular, polygonal, a shape with curved edges, or other suitable shapes. The electronic device may have a peripheral system such as a driving system, a control system, a light source system, and the like to support a display device, an antenna device, a wearable device (e.g., including augmented reality or virtual reality), an in-vehicle device (e.g., including car windshields), or a splicing device.

It should be noted that the technical solutions provided by the different embodiments hereinafter may be replaced, combined, or mixed with one another, so as to constitute another embodiment without violating the spirit of the disclosure.

Figure 2:
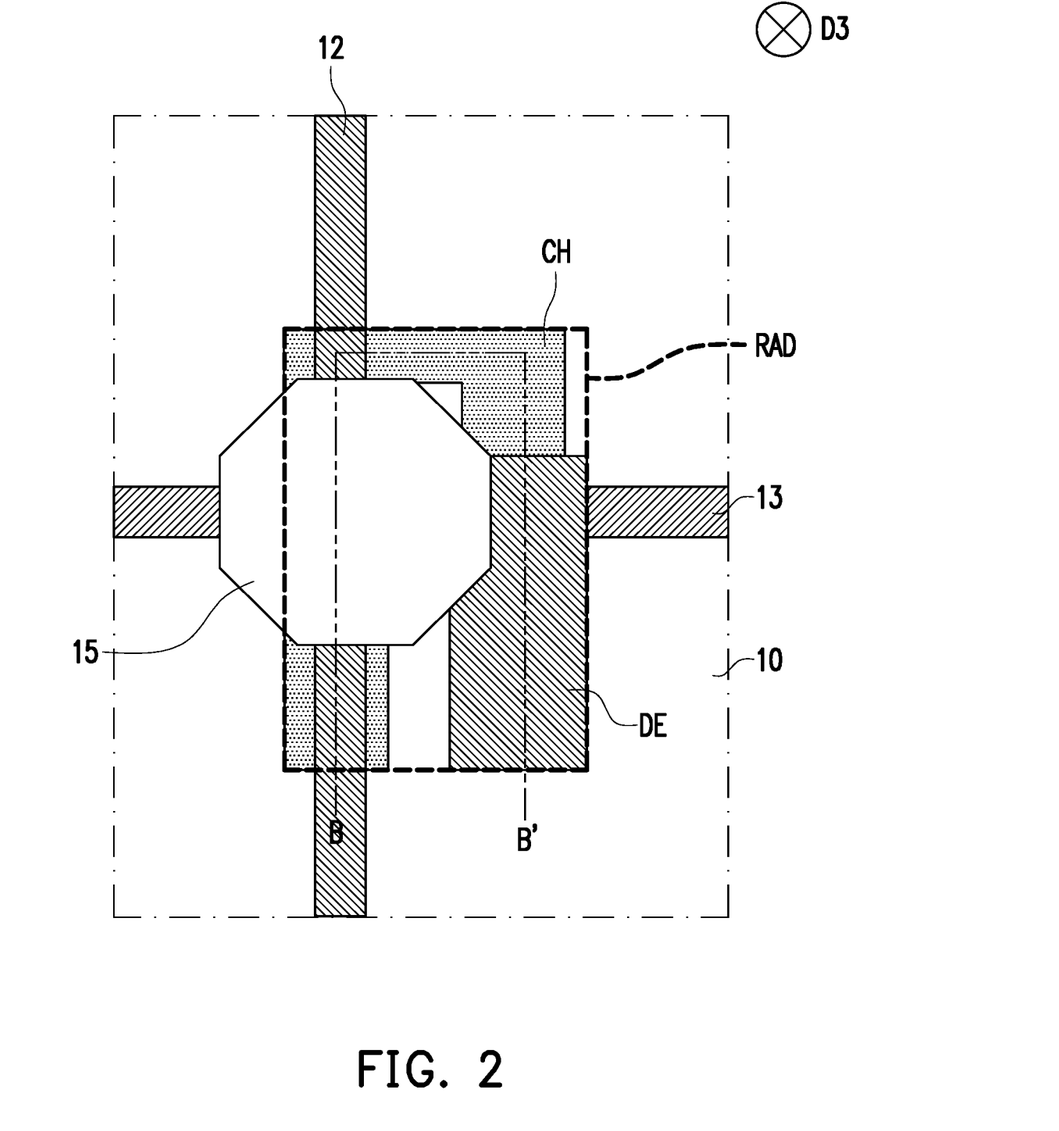
FIG. 2 is an enlarged schematic view of the region R in FIG. 1.
Figure 3:
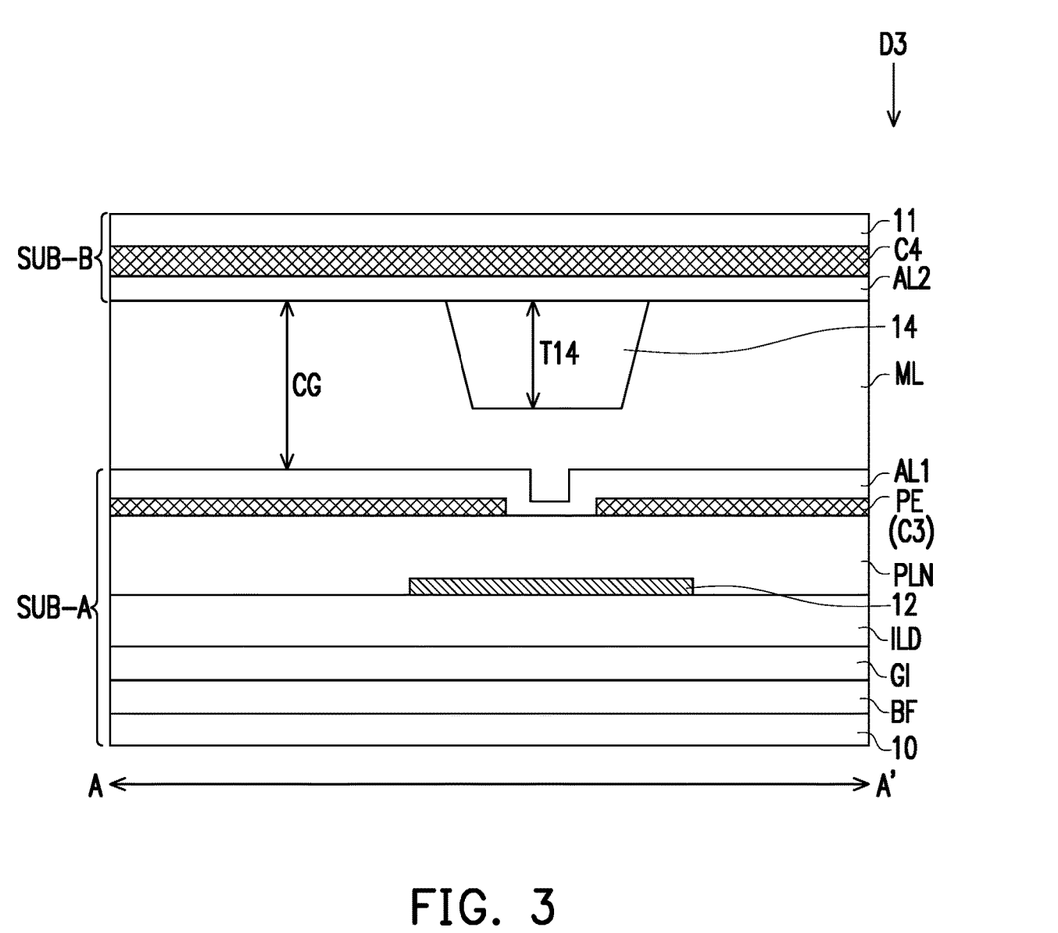
FIG. 3 and FIG. 4 are cross-sectional schematic views of the line A-A' in FIG. 1 and the line B-B' in FIG. 2, respectively.
Figure 4:
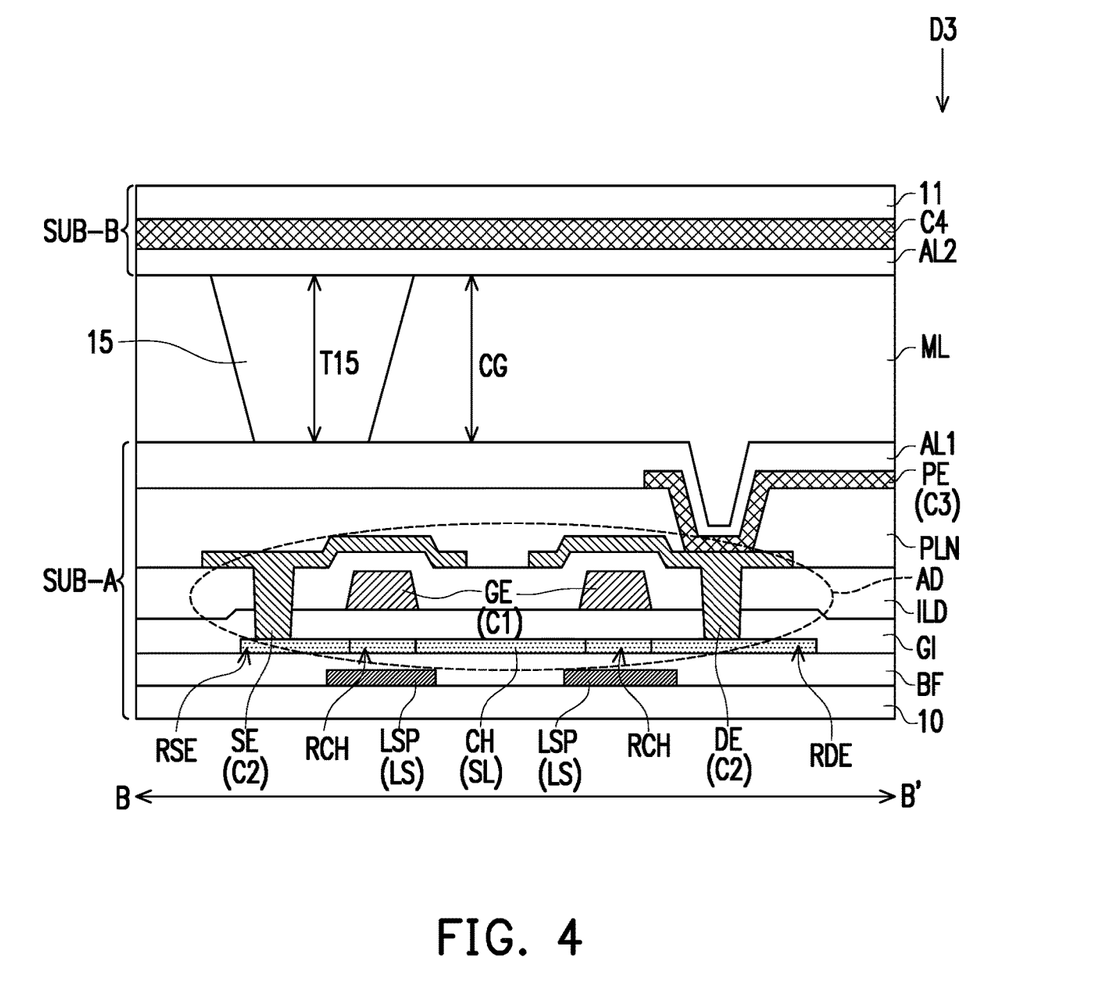

FIG. 1, FIG. 5, and FIG. 9A to FIG. 9C are partial top schematic views of electronic devices according to some embodiments of the disclosure. FIG. 2 is an enlarged schematic view of the region R in FIG. 1. FIG. 3 and FIG. 4 are cross-sectional schematic views of the line A-A' in FIG. 1 and the line B-B' in FIG. 2, respectively. FIG. 6A to FIG. 6D, FIG. 8A, and FIG. 8B are top schematic views of various relative arrangement relationships of signal lines and spacers. FIG. 7 is a schematic view of the relative arrangement relationship between liquid crystal molecules and spacers.

Referring to FIG. 1 to FIG. 4, the electronic device 1 may include a substrate 10, a signal line 12 and a spacer 14. The signal line 12 is disposed on the substrate 10 and includes at least one curve segment (such as the curve segment 120 in FIG. 5). The spacer 14 is disposed on the substrate 10 and is disposed corresponding to the at least one curve segment 120, that is, the spacer 14 at least partially overlaps with the at least one curve segment 120 in a top view direction (e.g., a direction D3) of the electronic device 1. For example, the electronic device 1 of the disclosure may be applied to augmented reality and may be used to adjust the lighting (light switch) to increase the display contrast, but not limited thereto. The "curve" in the disclosure is, for example, a non-straight line segment or a line segment with at least a radius of curvature, and the curve may be, for example, an S-shape or a line segment with at least one inflection point.

In detail, the substrate 10 may be a rigid substrate or a flexible substrate. The material of the substrate 10 includes, for example, glass, quartz, ceramics, sapphire, or plastic, etc., but not limited thereto. In some embodiments, the substrate 10 may be a flexible substrate, and the material of the substrate 10 may include polycarbonate (PC), polyimide (PI), polypropylene (PP), polyethylene terephthalate (PET), other suitable flexible materials, or a combination of the foregoing materials, but not limited thereto.

The signal line 12 may be, for example, a scan line, a data line, or other types of signal line. The material of the signal line 12 may include a metal, a metal alloy, a metal oxide, a transparent conductive material, any conductors, or a combination thereof, but not limited thereto. In some embodiments, the signal line 12 may be formed of a material with high conductivity such as a metal or a metal alloy to reduce impedance or facilitate signal transmission. In other embodiments, the signal line 12 may be formed of a transparent conductive material, which may reduce optical interference (e.g., diffraction), to improve the display quality of the electronic device.

Figure 1:
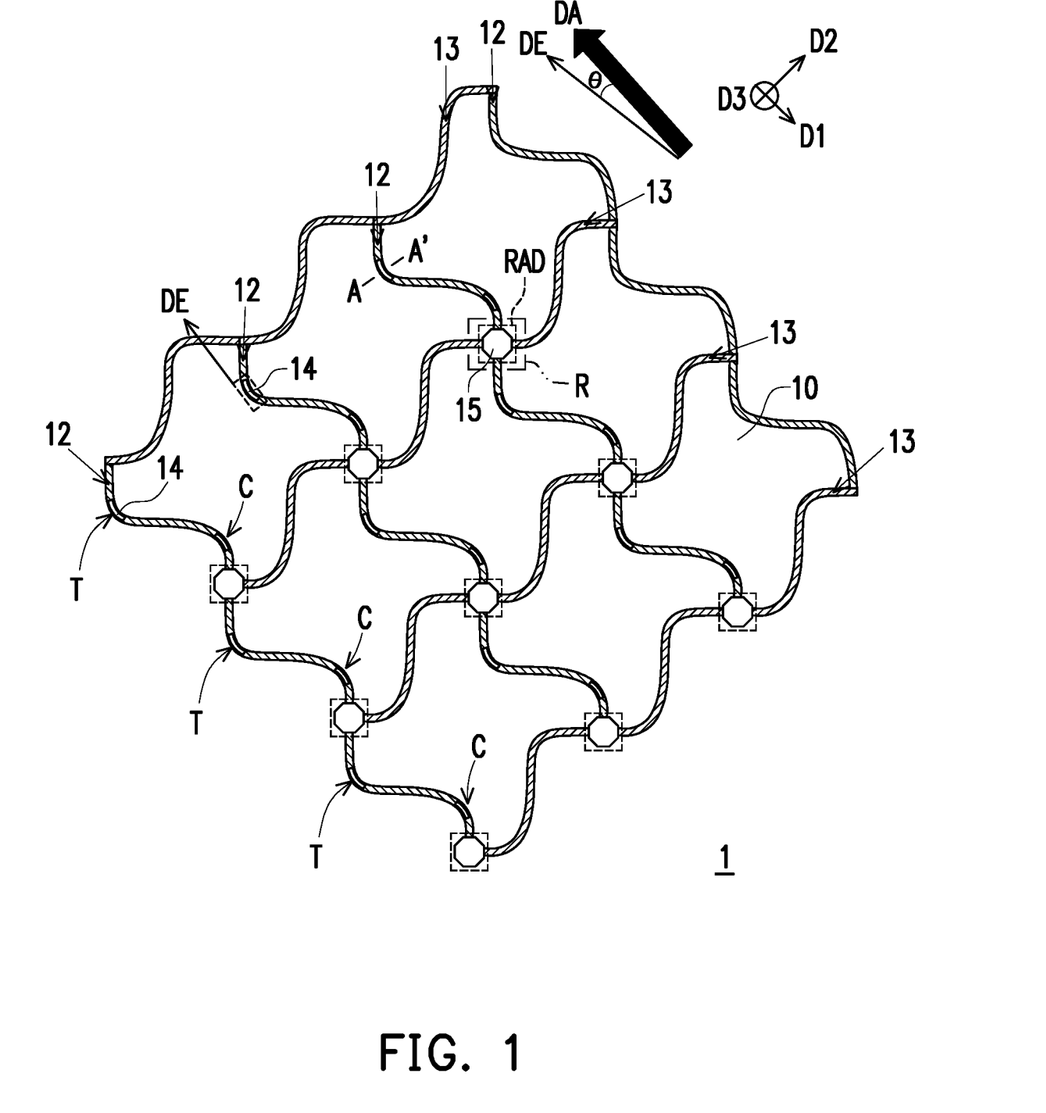
FIG. 1, FIG. 5, and FIG. 9A to FIG. 9C are partial top schematic views of electronic devices according to some embodiments of the disclosure.

FIG. 1 schematically shows that the signal line 12 includes multiple curve segments, and the curve segments are arranged in a direction D1 and connected in a wave shape. However, it should be understood that the type of the signal line 12, the number of curve segments, the arrangement of the curve segments, or the shape of the connection of the curve segments may be changed according to the actual requirements, and is not limited to what is shown in FIG. 1. In other embodiments, the electronic device further includes the signal line 13 extending generally in another direction (e.g., a direction D2), and the curve segments of the signal line 13 may be arranged in the direction D2 and connected to each other, but not limited thereto. In the disclosure, the direction D1 is, for example, the extension direction of the signal line 12, the direction D2 is, for example, the extension direction of the signal line 13, in which the direction D2 and the direction D3 may be generally perpendicular, and the direction D3 is, for example, a normal direction parallel to the surface of the substrate 10, in which the direction D3 may be perpendicular to the direction D1 and the direction D2.

The spacer 14 may include a main spacer, a sub-spacer, or a combination thereof. The opposite ends of the main spacer may respectively contact the active element array substrate SUB-A and the opposite substrate SUB-B, as shown by the spacer 15 of FIG. 4. One end of the sub-spacer may be in contact with one of the active element array substrate SUB-A and the opposite substrate SUB-B, and the other end of the sub-spacer is not in contact with another one of the active element array substrate SUB-A and the opposite substrate SUB-B when the electronic device 1 is not pressed, as shown by the spacer 14 of FIG. 3. The active element array substrate SUB-A may include, for example, the substrate 10 and film layers (e.g., insulating layers, conductive layers, and semiconductor layers) on the substrate 10, and the opposite substrate SUB-B may include, for example, the substrate 11 and the film layers (e.g., insulating layers, conductive layers) on the substrate 11. In some embodiments, the maximum thickness of the sub-spacers (such as the maximum thickness T14 of the spacer 14 in the direction D3 in FIG. 3) is smaller than the maximum thickness of the main spacers (the maximum thickness T15 of the spacer 15 in the direction D3 in FIG. 4). In other embodiments, the main spacer and/or the sub-spacer may be disposed corresponding to another supporting element (not shown). For example, when the main spacer is disposed on the active device array substrate, a supporting element may be disposed on the opposite substrate and at least partially overlaps with the main spacer in the direction D3, that is to say, one end of the main spacer is in contact with the supporting element at the other end of the substrate; another supporting element may also be disposed corresponding to the sub-spacer, but the disclosure is not limited thereto.

The electronic device 1 may include multiple spacers 14. In this embodiment, the spacers 14 are, for example, multiple sub-spacers, but not limited thereto. In other embodiments, although not shown, the spacers 14 may be multiple main spacers; alternatively, the spacers 14 may be a combination of multiple main spacers and multiple sub-spacers, that is, some of the spacers 14 are main spacers, while other spacers 14 are sub-spacers.

The spacers 14 may be disposed corresponding to the curve segments of the signal line 12. Taking FIG. 1 as an example, the spacers 14 may be disposed corresponding to the peak C, the trough T of the signal line 12, or a combination thereof, that is, the spacers 14 may be disposed to overlap with the peaks C of the signal line 12; alternatively, the spacers 14 may be disposed to overlap with the troughs T of the signal line 12; alternatively, the spacers 14 may be disposed to overlap with the peaks C and the troughs T in a wave shape. However, it should be understood that the relative arrangement relationship between the spacers 14 and the curve segments may be changed according to actual requirements, and is not limited to what is shown in FIG. 1.

Through the design of the corresponding arrangement of the spacer 14 and the signal line 12, the signal line 12 or the light shading pattern (not shown) for shading the signal line 12 may be used to shade the spacer 14, thereby facilitating the increase in space and density for disposing the spacer. Therefore, the electronic device 1 may maintain the required elastic resilience or uniformity of the gap while maintaining the required resolution and/or aperture ratio.

In some embodiments, the electronic device 1 may further include a medium layer ML and a substrate 11, and the substrate 10 is disposed corresponding to the substrate 11. The medium layer ML is disposed between the substrate 10 and the substrate 11 and has an alignment direction DA. The at least one curve segment 120 of the signal line 12 extends along a direction DE, and the direction DE and the alignment direction DA have an included angle θ, in which the included angle θ is for example, greater than or equal to 0 degrees and less than or equal to 20 degrees.

For example, the medium layer ML may include a liquid crystal material, but not limited thereto. Referring to FIG. 3 and FIG. 4, the electronic device 1 may further include an alignment layer AL1 and an alignment layer AL2, which are respectively disposed on the opposite sides of the medium layer ML to control the alignment direction DA of the medium layer ML. The alignment direction DA of the medium layer ML may be measured by a polarization measuring instrument (such as AxoScan) or a phase difference measurement system (such as RETS), but not limited thereto. In other embodiments, an optical microscope may be used to observe the rubbing traces around the spacers to measure the alignment direction. Referring to FIG. 6A, the extension direction (the direction DE) of the curve segment 120 may be a tangential direction TD of a vertex A of the curve segment 120; alternatively, a long axis direction L of a smallest rectangle RT surrounding the curve segment 120 may be used as the extension direction (the direction DE) of the curve segment 120.

As shown in FIG. 7, the liquid crystal molecules M adjacent to the spacers 14 in the medium layer ML are easily affected by the topography of the spacers 14, which causes abnormal alignment/mura, resulting light leakage LL1. In addition, the liquid crystal molecules M opposite to the side of the alignment direction DA that are adjacent to the spacers 14 are likely to cause the abnormal alignment/mura due to insufficient frictional force, resulting in light leakage LL2. The spacer 14 may be shaded by the signal line 12 or a light shading pattern (not shown) disposed overlapping with the signal line 12 to reduce the visibility of the light leakage LL1. On the other hand, the influenced area of the light leakage LL2 may be reduced or the light leakage LL2 may be shaded with a light shading pattern without greatly affecting the aperture ratio through the design of 0 degrees-≤the included angle θ≤20 degrees.

Referring to FIG. 2 and FIG. 4, in some embodiments, the electronic device 1 may further include an active element AD and another spacer 15. The active element AD is disposed on the substrate 10 and is electrically connected to the signal line 12. The active element AD may include a transistor, but not limited thereto. For example, the active element AD may include a gate electrode GE, a semiconductor pattern CH, a source electrode SE, and a drain electrode DE, but not limited thereto. A region RAD where the active element AD is located is defined by, for example, a minimum rectangular frame surrounding the gate electrode GE, the semiconductor pattern CH, the source electrode SE, and the drain electrode DE.

The spacer 15 overlaps with at least a part of the active element AD, that is, the spacer 15 at least partially overlaps with the region RAD where the active element AD is located in the direction D3. Through the design that the spacer 15 at least partially overlaps with the active element AD, a light shading pattern (not shown) for shading the active element AD may be used to shade the spacer 15, thereby facilitating the increase in space for disposing the spacer. Therefore, the electronic device 1 may maintain the required elastic resilience or uniformity of the gap while maintaining the required resolution and/or aperture ratio.

The spacer 15 may include a main spacer, a sub-spacer, or a combination thereof. The electronic device 1 may include multiple spacers 15. In this embodiment, the spacers 15 are, for example, multiple main spacers, but not limited thereto. In other embodiments, although not shown, the spacers 15 may be multiple sub-spacers; alternatively, the spacers 15 may be a combination of multiple main spacers and multiple sub-spacers, that is, some of the spacers 15 are main spacers, while other spacers 15 are sub-spacers.

The electronic device 1 may also include other elements or film layers according to different requirements. For example, as shown in FIG. 3 and FIG. 4, the electronic device 1 may further include a light shading layer LS, an insulating layer BF, a semiconductor layer SL, an insulating layer G1, a first conductive layer C1, an insulating layer ILD, a second conductive layer C2, an insulating layer PLN, a third conductive layer C3, and a fourth conductive layer C4, but not limited thereto. The electronic device 1 may add or subtract one or more elements/film layers according to different requirements.

The active element array substrate SUB-A includes, for example, the substrate 10, the light shading layer LS, the insulating layer BF, the semiconductor layer SL, the insulating layer G1, the first conductive layer C1, the insulating layer ILD, the second conductive layer C2, the insulating layer PLN, the third conductive layer C3, and the alignment layer AL1. The opposite substrate SUB-B includes, for example, the substrate 11, the fourth conductive layer C4 and the alignment layer AL2.

The light shading layer LS is disposed on the substrate 10. The light shading layer LS may be formed of a light-reflecting material (e.g., a metal or a metal alloy) or a light-absorbing material (e.g., a black matrix). The light shading layer LS may include a light shading pattern LSP. The light shading pattern LSP may be disposed corresponding to a channel region RCH of the semiconductor layer SL, that is, the light shading pattern LSP overlaps with the channel region RCH in the direction D3.

The insulating layer BF is disposed on the substrate 10 and covers the light shading layer LS. The material of the insulating layer BF may include an inorganic insulating material, such as silicon oxide or silicon nitride, but not limited thereto.

The semiconductor layer SL is disposed on the insulating layer BF. The material of the semiconductor layer SL may include an oxide semiconductor material, such as indium gallium zinc oxide (IGZO), but not limited thereto. In other embodiments, the material of the semiconductor layer SL may include amorphous silicon, polysilicon, a metal oxide, or a combination thereof (e.g., when there are multiple active elements). The semiconductor layer SL may include the semiconductor pattern CH. The semiconductor pattern CH may include the channel region RCH, a source region RSE, and a drain region RDE, but not limited thereto.

The insulating layer G1 is disposed on the semiconductor layer SL. For example, the material of the insulating layer G1 may include an inorganic material, such as silicon oxide or silicon nitride, but not limited thereto.

The first conductive layer C1 is disposed on the insulating layer G1. For example, the material of the first conductive layer C1 includes a metal or a metal stack, such as aluminum, molybdenum or titanium/aluminum/titanium. The first conductive layer C1 may include the gate electrode GE, a signal line (such as the signal line 13 shown in FIG. 2), etc., but not limited thereto. The gate electrode GE is disposed corresponding to the channel region RCH, that is, the gate electrode GE overlaps with the channel region RCH in the direction D3. The signal line 13 may be a scan line, a data line, or other types of signal line. FIG. 1 schematically shows that the signal line 13 includes multiple curve segments, and the curve segments are arranged in the direction D2 and connected in a wave shape. However, it should be understood that the type of the signal line 13, the number of curve segments, the arrangement of the curve segments, or the shape of the connection of the curve segments may be changed according to the actual requirements, and not limited to what is shown in FIG. 1.

The insulating layer ILD is disposed on the first conductive layer C1. For example, the material of the insulating layer ILD may include an inorganic material, such as silicon oxide or silicon nitride, but not limited thereto. In some embodiments, although not shown, the insulating layer ILD may be a stacked layer of multiple insulating materials.

The second conductive layer C2 is disposed on the insulating layer ILD. For example, the material of the second conductive layer C2 includes a metal, a metal oxide, or a metal stack, such as aluminum, molybdenum or titanium/aluminum/titanium, or indium tin oxide. The second conductive layer C2 may include the source electrode SE, the drain electrode DE, a signal line (e.g., the signal line 12), etc., but not limited thereto. The source electrode SE penetrates through the insulating layer ILD and the insulating layer G1 and is connected to the source electrode region RSE. The drain electrode DE penetrates the insulating layer ILD and the insulating layer G1 and is connected to the drain electrode region RDE.

The insulating layer PLN is disposed on the insulating layer ILD and covers the second conductive layer C2. For example, the material of the insulating layer PLN includes an organic material or a polymer material, such as polymethyl methacrylate (PMMA), epoxy, acrylic-based, silicone, polyimide polymer, or a combination thereof, but not limited thereto. In some embodiments, although not shown, the insulating layer PLN may be a stacked layer of multiple layers of organic materials or polymer materials.

The third conductive layer C3 is disposed on the insulating layer PLN. The material of the third conductive layer C3 includes a transparent conductive material, such as a metal oxide, but not limited thereto. The third conductive layer C3 may include a pixel electrode PE, but not limited thereto. The pixel electrode PE penetrates through the insulating layer PLN and is connected to the drain electrode DE.

The alignment layer AL1 is disposed on the third conductive layer C3. The alignment layer AL1 may be a photo-alignment layer, but not limited thereto.

The fourth conductive layer C4 and the alignment layer AL2 are sequentially disposed on the surface of the substrate 11 facing the active element array substrate SUB-A. The substrate 11 may be a rigid substrate or a flexible substrate.

The material of the substrate 11 may be the same as or similar to the material of the substrate 10, and details are not described herein again. The material of the fourth conductive layer C4 includes a transparent conductive material, such as a metal oxide, but not limited thereto. The fourth conductive layer C4 may be an entire conductive layer, but not limited thereto. The alignment layer AL2 may be a photo-alignment layer, but not limited thereto.

Figure 5:
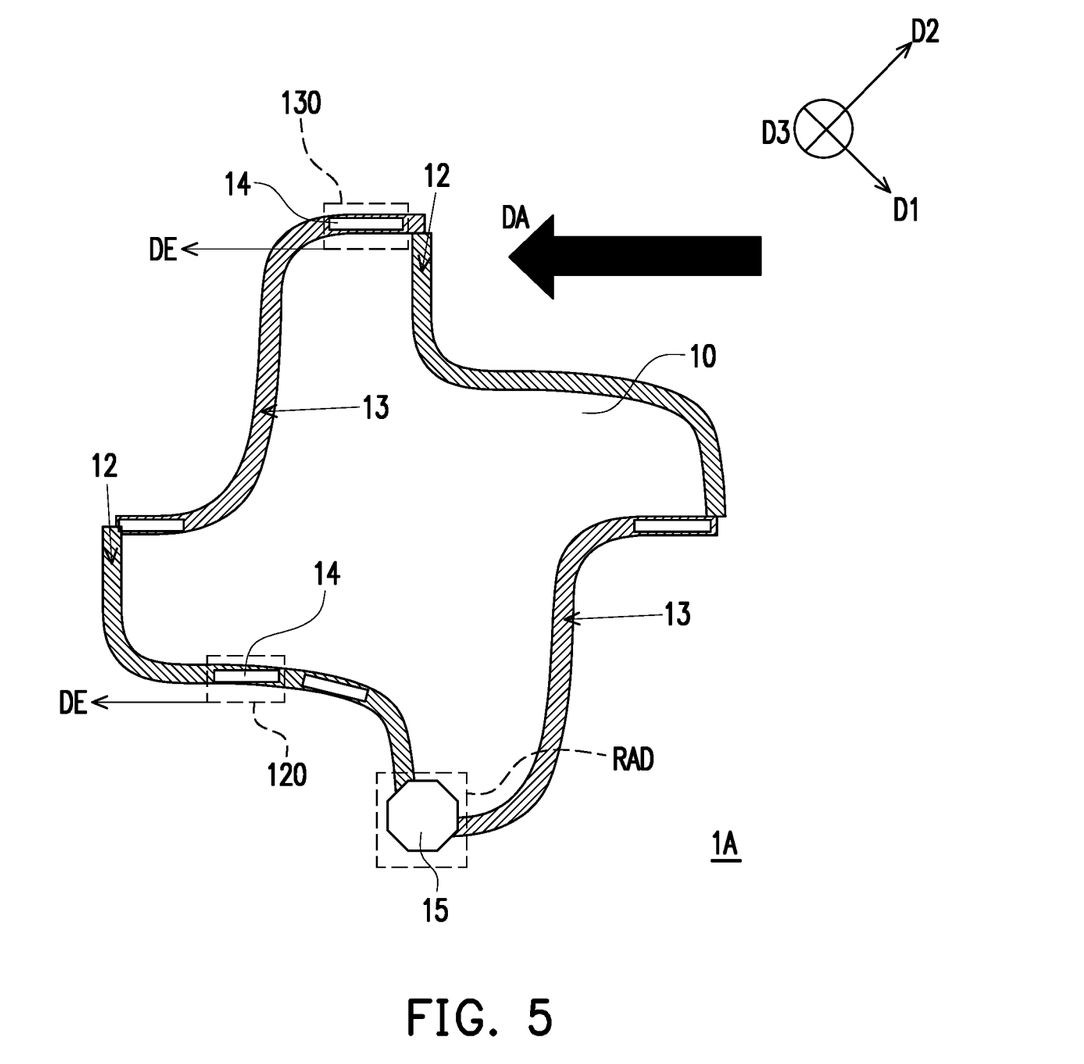
Figure 6A:
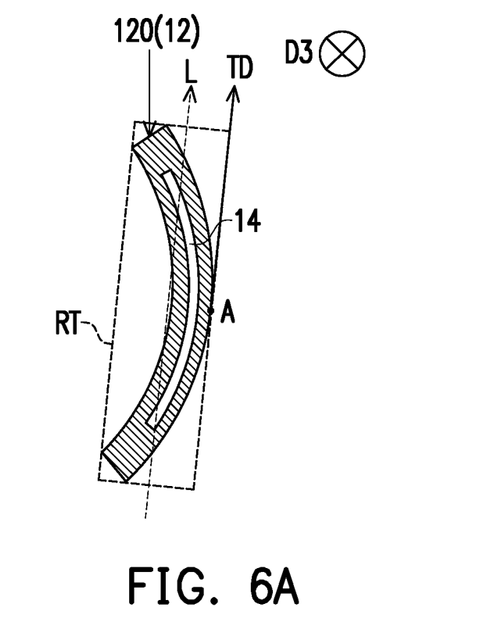
FIG. 6A to FIG. 6D, FIG. 8A, and FIG. 8B are top schematic views of various relative arrangement relationships of signal lines and spacers.

Referring to FIG. 5, the main difference between an electronic device 1A and the electronic device 1 of FIG. 1 is that the spacers 14 are respectively disposed to overlap with the signal line 12 and the signal line 13. In addition, the alignment direction DA of the medium layer (not shown) in FIG. 5 is different from the alignment direction DA of the medium layer (not shown) in FIG. 1, and the relative arrangement relationship of the spacer 14 and the signal line 12 (or the signal line 13) changes according to the alignment direction DA of the medium layer, to satisfy the design that the included angle between the extension direction (direction DE) of the curve segment 120 of the signal line 12 (or the curve segment 130 of the signal line 13) and the alignment direction DA is greater than or equal to 0 degrees and less than or equal to 20 degrees.

Figure 6B:
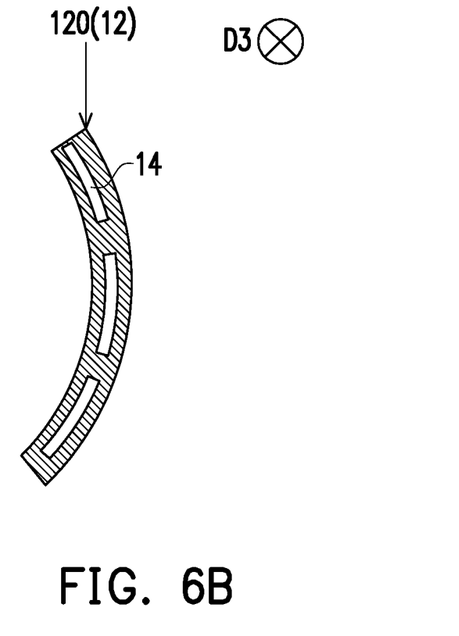
Figure 6C:
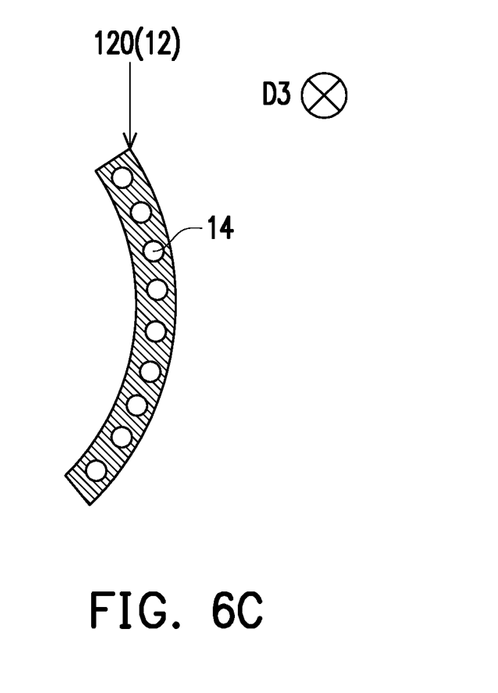
Figure 6D:
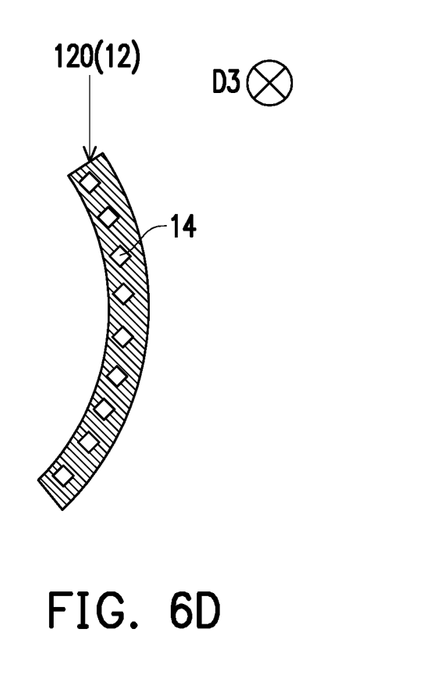
Figure 7:
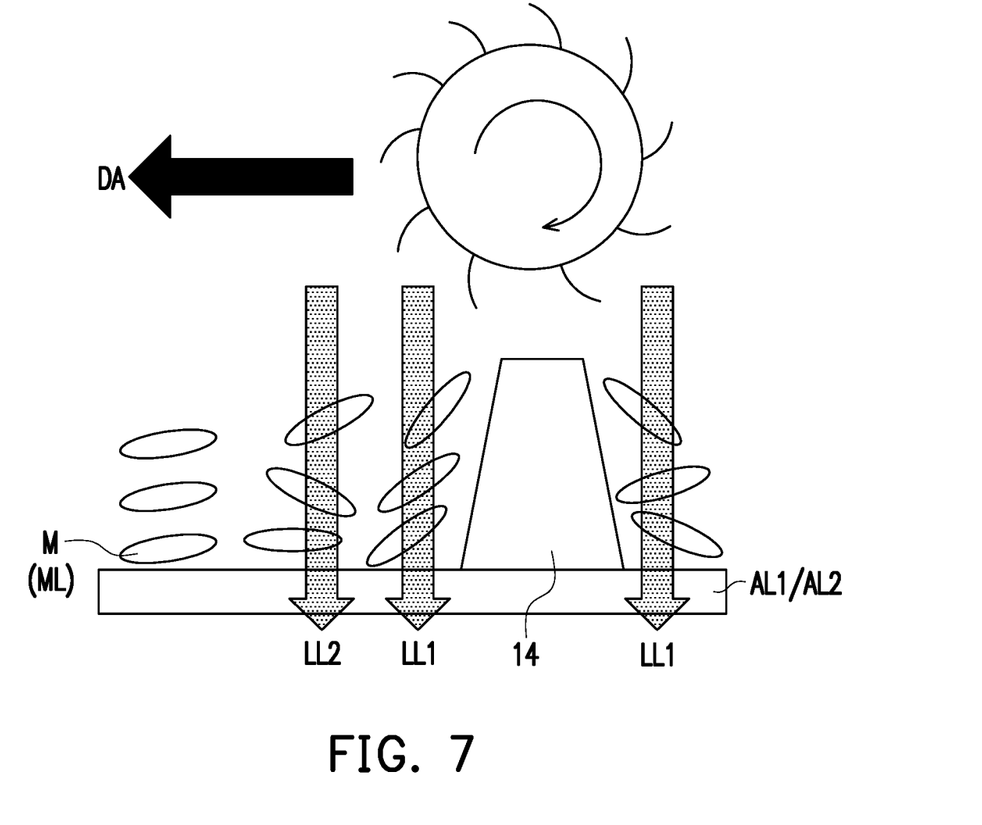
FIG. 7 is a schematic view of the relative arrangement relationship between liquid crystal molecules and spacers.

In some embodiments, the spacer 14 overlapping with the signal line 12 (or the signal line 13) may be a single spacer (as shown in FIG. 6A) to have greater support strength; alternatively, the spacer 14 may be a spacer group (as shown in FIG. 6B to FIG. 6D) to reduce the risk of spacer peeling.

In some embodiments, the shape of the spacer 14 may be straight (as shown in FIG. 5), curved (as shown in FIG. 6A and FIG. 6B), dotted (the circles or the polygonal shapes as shown in FIG. 6C and FIG. 6D), or a combination thereof to provide different prepressing heights.

Figure 8A:
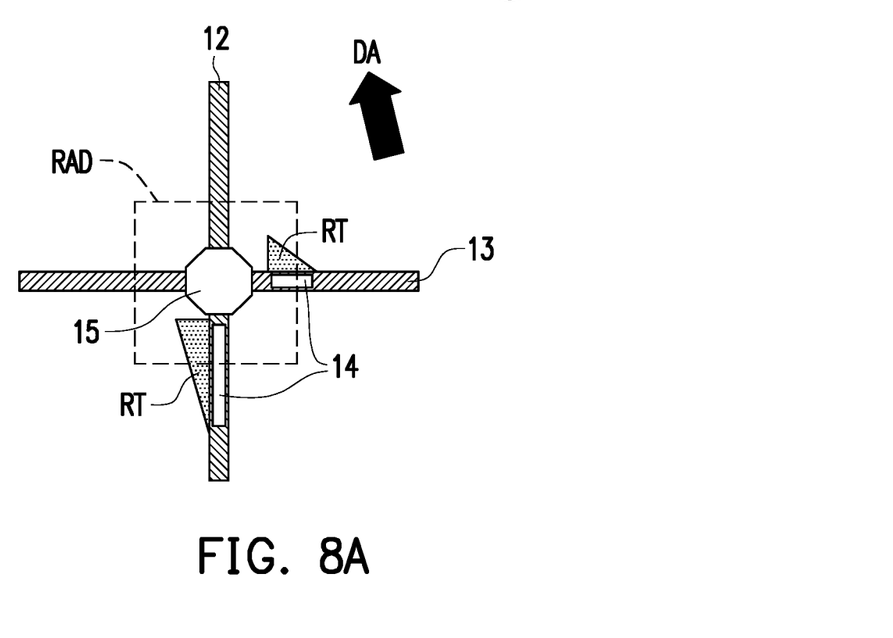
Figure 8B:
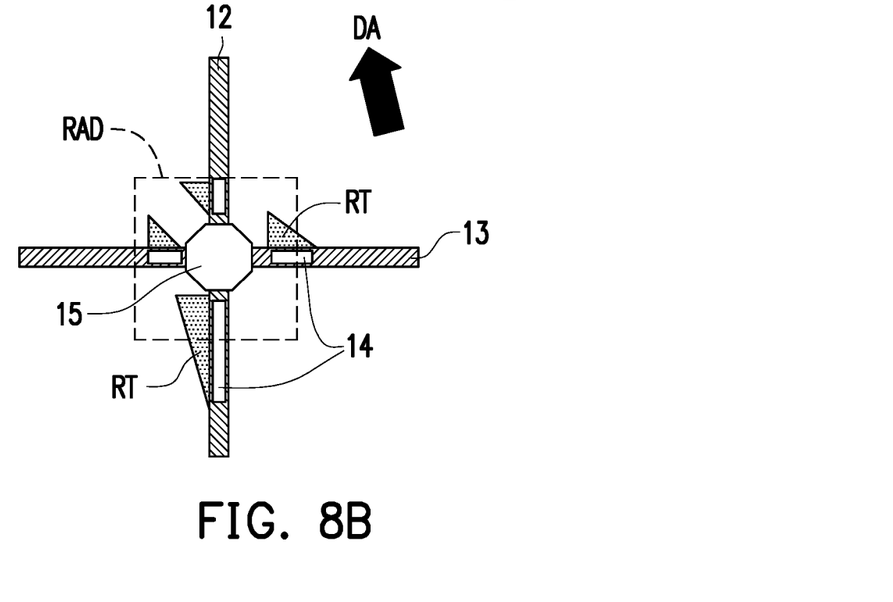

In some embodiments, in order to shade the light leakage LL2 resulting from the abnormal alignment/mura caused by the spacers 14 opposite to the side of the alignment direction DA in FIG. 7 due to insufficient frictional force, as shown in FIG. 8A and FIG. 8B, the relative arrangement relationship between the spacer 14 and the signal line 12 (or the signal line 13) may be changed according to the alignment direction DA of the medium layer (not shown), so that the rubbing trace region RT (i.e., the region resulting from the abnormal alignment/mura caused by the spacers 14 opposite to the side of the alignment direction DA in FIG. 7 due to insufficient frictional force) falls in the region RAD where the active element is located, so as to shade the light leakage LL2 in FIG. 7 using the light shading pattern (not shown) that shades the region RAD.

Figure 9A:
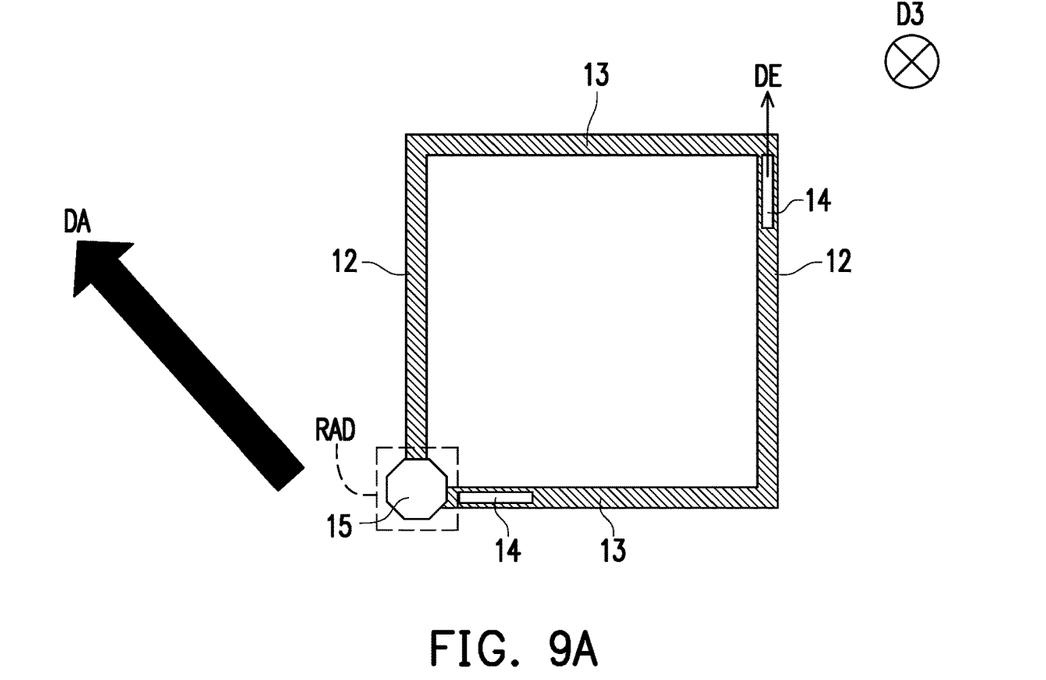
Figure 9B:
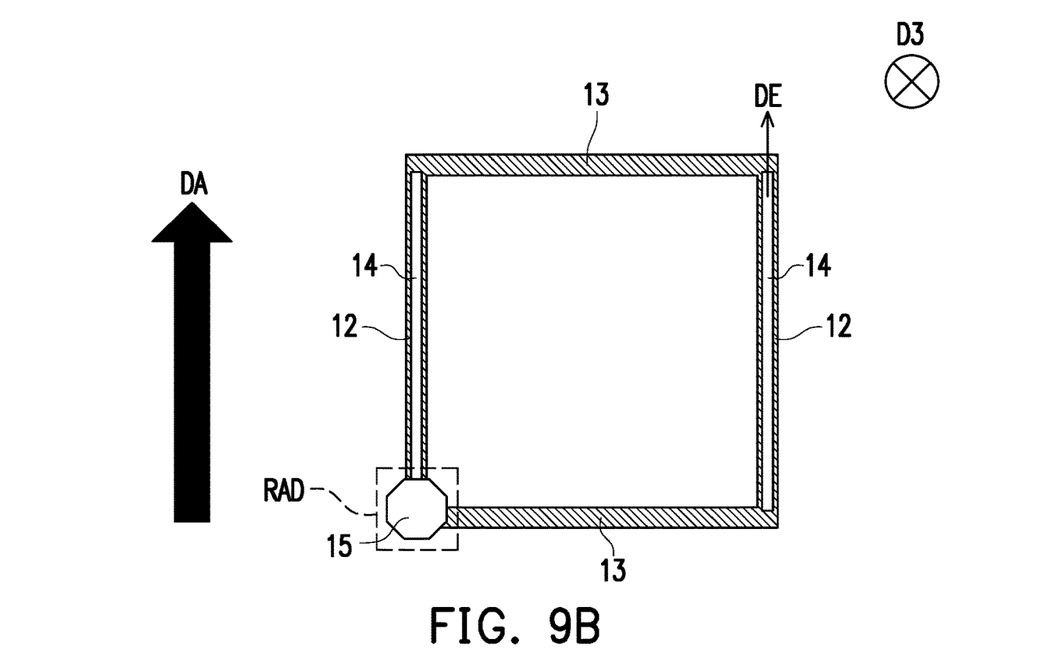
Figure 9C:
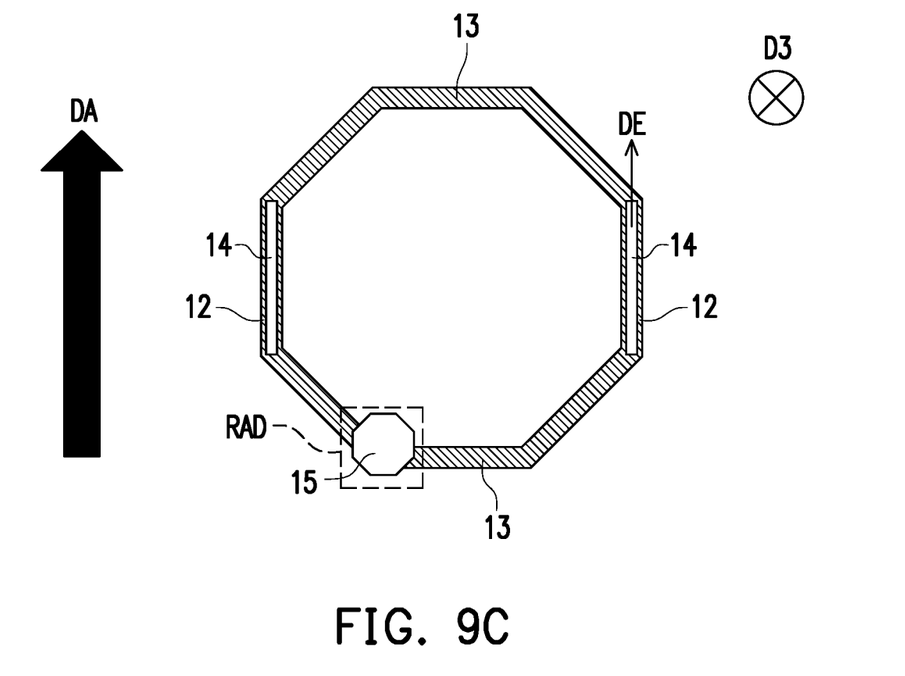

In some embodiments, as shown in FIG. 9A to FIG. 9C, the signal line 12 and/or the signal line 13 may be a straight line or a broken line, and the region surrounded by two adjacent signal lines 12 and two adjacent signal lines 13 may be a quadrilateral, a hexagonal, or other polygonal shapes. In FIG. 9A to FIG. 9C, reference may be made to the design in FIG. 1 or FIG. 5, where the included angle between the extension direction (direction DE) of the signal line 12 and the alignment direction DA is greater than or equal to 0 degrees and less than or equal to 20 degrees, and/or the design in FIG. 8A or FIG. 8B, where the rubbing trace region RT falls in the region RAD, to reduce the light leakage caused by disposing the spacer 14.

In the embodiment of the disclosure, through the design of the corresponding arrangement of the spacers and the signal lines, the signal lines or the light shading pattern for shading the signal lines may be used to shade the spacers, which facilitates in increasing the space for disposing the spacers, and the number or arrangement density of the spacers are reduced without the need of considering the resolution and/or aperture ratio. Therefore, an electronic device may maintain the required elastic resilience or uniformity of the gap while maintaining the required resolution and/or aperture ratio.

The foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

Although the embodiments of the disclosure and the advantages thereof have been disclosed above, it should be understood that any person with ordinary skill in the art may make changes, substitutions, and modifications without departing from the spirit and scope of the disclosure, and the features of the various embodiments may be arbitrarily mixed and replaced with one another to form other new embodiments. In addition, the protection scope of the disclosure is not limited to the processes, machines, manufactures, compositions of the matter, devices, methods, and steps in the specific embodiments described in the specification. It is understood that processes, machines, manufactures, compositions of matter, devices, methods, and steps developed in the present or in the future may be used in accordance with the disclosure as long as they may implement substantially the same functions or achieve substantially the same results in the embodiments described herein. Therefore, the protection scope of the disclosure includes the above-mentioned processes, machines, manufactures, compositions of matter, devices, methods, and steps. In addition, each of the claims constitutes a separate embodiment, and the protection scope of the disclosure also includes each of the combinations of the embodiments. The protection scope of the disclosure shall be determined by the appended claims.

What is claimed is:

1. An electronic device, comprising:
   an active element array substrate, comprising:
   a substrate;
   a signal line, disposed on the substrate and comprising at least one curve segment, wherein the at least one curve segment of the signal line extends along a first direction;
   a first spacer, disposed on the substrate and is disposed corresponding to the at least one curve segment, wherein an extension direction of the first spacer is the same as the first direction;
   an active element, disposed on the substrate and electrically connected to the signal line, wherein the active element comprises a gate electrode, a semiconductor pattern, a source electrode, and a drain electrode, and a region where the active element is located is defined by a minimum rectangular frame surrounding the gate electrode, the semiconductor pattern, the source electrode, and the drain electrode;
   a second spacer, disposed on the substrate, wherein when viewed from a top view direction of the electronic device, the second spacer completely falls in the region; and
   a light shading pattern, disposed between the substrate and the active element, wherein the light shielding pattern is overlapped with the semiconductor pattern, the signal line and the second spacer in the top view direction,
wherein a width of the signal line along a second direction is greater than a width of the first spacer along the second direction, the second direction is substantially perpendicular to the first direction.

2. The electronic device according to claim 1, further comprising:
a medium layer, disposed on the substrate and having an alignment direction, wherein the first direction and the alignment direction have an included angle, and the included angle is greater than or equal to 0 degrees and less than or equal to 20 degrees.

3. The electronic device according to claim 2, wherein the first spacer comprises a main spacer, a sub-spacer, or a combination thereof.

4. The electronic device according to claim 2, wherein the medium layer comprises a liquid crystal material.

5. The electronic device according to claim 1, wherein the second spacer overlaps with at least a part of the active element.

6. The electronic device according to claim 5, wherein the first spacer is disposed adjacent to the second spacer.

7. The electronic device according to claim 6, wherein the first spacer is a sub-spacer, and the second spacer is a main spacer.

8. The electronic device according to claim 1, wherein the first spacer is a spacer group.

9. The electronic device according to claim 8, wherein the spacer group is arranged along a curved direction of the at least one curve segment.

10. The electronic device according to claim 1, wherein a shape of the first spacer is straight, curved, or a combination thereof.

11. The electronic device according to claim 1, wherein the signal line is a scan line or a data line.

12. The electronic device according to claim 1, further comprising:
an alignment layer, disposed on the substrate, wherein the alignment layer is a photo-alignment layer.

13. The electronic device according to claim 1, wherein a quantity of the first spacer is multiple, and the first spacers are disposed corresponding to a peak, a trough of the signal line, or a combination thereof.

14. The electronic device according to claim 1, wherein the electronic device is a light switch.

15. The electronic device according to claim 1, wherein the signal line comprises a plurality of curve segments, and the curve segments are connected in a wave shape.

16. The electronic device according to claim 1, wherein the first spacer is a curved spacer, and the curved spacer curves according to a curved direction of the at least one curve segment.

17. The electronic device according to claim 1, wherein the light shading pattern is formed of a light-reflecting material or a light-absorbing material.

* * * * *